US010732113B2

(12) United States Patent
Stubbe et al.

(10) Patent No.: US 10,732,113 B2
(45) Date of Patent: Aug. 4, 2020

(54) METHOD AND DEVICE FOR HIGH THROUGHPUT IMAGING

(71) Applicant: Single Technologies AB, Stockholm (SE)

(72) Inventors: Raoul Stubbe, Stocksund (SE); Bengt Sahlgren, Saltsjö-Boo (SE); Johan Strömqvist, Stockholm (SE)

(73) Assignee: SINGLE TECHNOLOGIES AB, Stockholm (SE)

( * ) Notice: Subject to any disclaimer, the term of this patent is extended or adjusted under 35 U.S.C. 154(b) by 31 days.

(21) Appl. No.: 16/079,900

(22) PCT Filed: Feb. 23, 2017

(86) PCT No.: PCT/EP2017/054244
§ 371 (c)(1),
(2) Date: Aug. 24, 2018

(87) PCT Pub. No.: WO2017/144619
PCT Pub. Date: Aug. 31, 2017

(65) Prior Publication Data
US 2019/0049382 A1 Feb. 14, 2019

(30) Foreign Application Priority Data
Feb. 26, 2016 (SE) ...................................... 1650251

(51) Int. Cl.
*G01N 21/64* (2006.01)
*G02B 21/00* (2006.01)
(Continued)

(52) U.S. Cl.
CPC ....... *G01N 21/6458* (2013.01); *G01N 21/474* (2013.01); *G01N 21/51* (2013.01);
(Continued)

(58) Field of Classification Search
CPC .. G01N 21/6458; G01N 21/474; G01N 21/51; G01N 21/6486; G01N 2021/6484;
(Continued)

(56) References Cited

U.S. PATENT DOCUMENTS 3,701,620 A * 10/1972 Berkman et al. ...... G01N 21/03
356/246
4,902,132 A * 2/1990 Murphy, Jr. ....... G01N 15/1468
356/244

(Continued)

FOREIGN PATENT DOCUMENTS

WO   WO 2016/030464 A1   3/2016

OTHER PUBLICATIONS

International Search Report and Written Opinion, dated May 11, 2017, in International Patent Application No. PCT/EP2017/054244.
(Continued)

*Primary Examiner* — Mohamed K Amara
(74) *Attorney, Agent, or Firm* — Knobbe, Martens, Olson & Bear, LLP (57) ABSTRACT

An apparatus for imaging a includes an light source for illuminating the sample simultaneously in a line focus or an array of foci; and a sensor for detecting photons emitted or scattered from the sample simultaneously in an array of fields of view. An array of sub-observation volumes in the sample, from which photons are emitted or scattered during imaging, is defined by the volumes in space where the line focus or array of foci from the light source overlap with the corresponding array of field of views of the sensor. A cylindrical sample holder holds the sample at a surface and is rotatably arranged such that at least a portion of the sample can be transported through at least one of the
(Continued)

sub-observation volumes by rotating the sample holder. The apparatus can be used in a high-throughput method of imaging.

41 Claims, 3 Drawing Sheets

(51) Int. Cl.
| | |
|---|---|
| G02B 21/26 | (2006.01) |
| G02B 21/33 | (2006.01) |
| G02B 19/00 | (2006.01) |
| G02B 27/10 | (2006.01) |
| G02B 27/14 | (2006.01) |
| G01N 21/47 | (2006.01) |
| G01N 21/51 | (2006.01) |

(52) U.S. Cl.
CPC ..... *G01N 21/6486* (2013.01); *G02B 19/0019* (2013.01); *G02B 19/0057* (2013.01); *G02B 21/0032* (2013.01); *G02B 21/0036* (2013.01); *G02B 21/0064* (2013.01); *G02B 21/0076* (2013.01); *G02B 21/26* (2013.01); *G02B 21/33* (2013.01); *G02B 27/1006* (2013.01); *G02B 27/141* (2013.01); *G01N 2021/6419* (2013.01); *G01N 2021/6471* (2013.01); *G01N 2021/6478* (2013.01); *G01N 2021/6482* (2013.01); *G01N 2021/6484* (2013.01); *G01N 2201/0833* (2013.01); *G01N 2201/103* (2013.01)

(58) Field of Classification Search
CPC ..... G01N 2021/6419; G01N 2201/103; G01N 2021/6471; G01N 2021/6478; G01N 2021/6482; G01N 2201/0833; G02B 19/0019; G02B 21/0064; G02B 19/0057; G02B 21/0036; G02B 27/1006; G02B 27/141; G02B 21/0032; G02B 21/0076; G02B 21/26; G02B 21/33
See application file for complete search history.

(56) References Cited

U.S. PATENT DOCUMENTS

| | | | | |
|---|---|---|---|---|
| 5,268,747 A * | 12/1993 | Schoeps | ............... | G01B 11/303 356/429 |
| 5,532,874 A * | 7/1996 | Stein | ................. | G02B 21/0024 359/368 |
| 5,671,085 A * | 9/1997 | Gustafsson | ............ | G02B 21/22 359/368 |
| 6,208,411 B1 | 3/2001 | Vaez-Iravani | | |
| 6,248,988 B1 * | 6/2001 | Krantz | ................. | G02B 21/004 250/201.3 |
| 6,469,311 B1 * | 10/2002 | Modlin | ............... | G01N 21/6408 250/559.4 |
| 6,745,067 B1 * | 6/2004 | Zavislan | .............. | A61B 5/0066 600/473 |
| 6,844,965 B1 | 1/2005 | Engelhardt | | |
| 6,867,851 B2 * | 3/2005 | Blumenfeld | ....... | G01N 21/6428 356/73 |
| 7,047,064 B1 * | 5/2006 | Zavislan | .............. | A61B 5/0059 359/368 |
| 7,248,360 B2 * | 7/2007 | Horchner | ............. | G01J 3/2803 250/458.1 |
| 7,289,217 B2 * | 10/2007 | Boege | ................. | G01N 21/253 356/417 |
| 7,295,314 B1 * | 11/2007 | Spady | ................ | G01N 21/9501 356/237.1 |
| 7,307,802 B2 * | 12/2007 | Unger | .................... | G02B 21/36 359/793 |
| 7,318,907 B2 * | 1/2008 | Stark | .................... | A61K 31/428 250/491.1 |
| 7,323,681 B1 * | 1/2008 | Oldham | ............ | G01N 21/6428 250/208.1 |
| 7,999,938 B2 * | 8/2011 | Wang | .................. | A61B 5/0059 356/369 |
| 8,385,619 B2 * | 2/2013 | Soenksen | ............ | G02B 21/002 382/128 |
| 8,699,025 B2 * | 4/2014 | Hall | ..................... | G01N 21/532 356/338 |
| 8,922,887 B2 * | 12/2014 | Cooper | ................. | G02B 21/06 359/368 |
| 9,176,310 B2 * | 11/2015 | Gareau | ................. | G02B 21/16 |
| 9,366,617 B1 * | 6/2016 | Doggett | ................ | B65D 25/54 |
| 9,386,211 B2 * | 7/2016 | Soenksen | ........... | H04N 5/23206 |
| 9,395,357 B2 * | 7/2016 | Tanabe | .................. | G01N 5/045 |
| 9,561,003 B2 * | 2/2017 | Bambot | ................ | A61B 5/0059 |
| 9,658,442 B2 * | 5/2017 | Geissbuehler | ...... | G01N 21/6458 |
| 9,664,620 B2 * | 5/2017 | Lippert | .................. | G02B 21/06 |
| 9,677,988 B1 * | 6/2017 | Doggett | ................ | B01F 11/0002 |
| 10,101,274 B2 * | 10/2018 | Lemieux | ................. | G01J 3/443 |
| 10,352,860 B2 * | 7/2019 | Kanarowski | ....... | G02B 21/0032 |
| 2002/0024018 A1 * | 2/2002 | Saito | ................... | G01N 21/645 250/458.1 |
| 2003/0020474 A1 * | 1/2003 | Gerald, II | ........... | G01R 33/307 324/318 |
| 2005/0206895 A1 * | 9/2005 | Salmelainen | ...... | G01N 21/6408 356/318 |
| 2006/0197946 A1 | 9/2006 | Biellak | | |
| 2006/0226374 A1 | 10/2006 | Rigler | | |
| 2007/0030005 A1 * | 2/2007 | Krahn | .................. | G01R 33/307 324/321 |
| 2007/0178012 A1 * | 8/2007 | Ferrante | ................ | B01L 3/5085 422/82.05 |
| 2007/0188750 A1 | 8/2007 | Lundquist | | |
| 2008/0293154 A1 * | 11/2008 | Makiuchi | ........... | G01N 21/6428 436/172 |
| 2010/0078576 A1 | 4/2010 | Ntziachristos | | |
| 2010/0315637 A1 * | 12/2010 | Trainoff | ................ | G01N 21/51 356/337 |
| 2015/0116702 A1 | 4/2015 | Matsumoto | | |
| 2015/0119708 A1 * | 4/2015 | Sachse | ................ | A61B 5/0071 600/431 |
| 2015/0160354 A1 * | 6/2015 | Mertens | ............... | G01N 23/046 378/9 |
| 2016/0097727 A1 * | 4/2016 | Vazhaeparambil | ......................... | G01N 21/8851 382/145 |
| 2016/0231547 A1 * | 8/2016 | Kubo | ................... | G02B 21/008 |
| 2017/0031149 A1 * | 2/2017 | Levin | ................. | G02B 21/0088 |
| 2017/0184498 A1 * | 6/2017 | Ludwig | ............. | G01N 15/1484 |
| 2019/0056581 A1 * | 2/2019 | Tomer | .................. | G02B 21/367 |

OTHER PUBLICATIONS

International Preliminary Report on Patentability, dated Aug. 28, 2018, in International Patent Application No. PCT/EP2017/054244.

* cited by examiner

METHOD AND DEVICE FOR HIGH THROUGHPUT IMAGING

PRIORITY AND CROSS REFERENCE TO RELATED APPLICATIONS

This application is a U.S. National Phase Application under 35 U.S.C. § 371 of International Application No. PCT/EP2017/054244, filed Feb. 23, 2017, designating the U.S. and published in English as WO 2017/144619 A1 on Aug. 31, 2017, which claims the benefit of Sweden Patent Application No. SE 1650251-0, filed Feb. 26, 2016. All applications for which a foreign or a domestic priority is claimed are identified in the Application Data Sheet filed herewith and are hereby incorporated by reference in their entirety under 37 C.F.R. § 1.57.

TECHNICAL FIELD

The present invention provides methods and apparatus to detect, monitor, image, and retrieve data from primarily organic matter, but not excluding inorganic matter, and from chemical, biochemical, or biological reactions, interactions, pathways or sequences in this matter. In particular the invention provides methods and devices to study the said matter with high spatial resolution in three dimensions with high throughput and at a lower cost per sample, e.g. in cells, including living cells, in living tissue, and in solutions containing organic matter. A further application specifically targeted is the possibility to monitor DNA and RNA related activities in cells, including living cells, or in solution.

BACKGROUND

There is a plethora of methods and devices to image biological samples. Predominantly these are variations of confocal microscopy patented by Marvin Minsky 1957. The popularity of confocal microscopy is due to its sectioning capability that enables comparably high resolution in three dimensions and better contrast than can be accomplished with conventional wide-field microscopy. Very often confocal microscopy is combined with fluorescence spectroscopy, where specific particles, e.g. proteins, are marked with fluorophores and thus can be discerned from the background. In most confocal microscopes, the same optics (at least the same objective lens) is used both for the illuminating/exciting and for viewing/detecting the light from the sample under study. An advantage with this configuration is that it mimics the design of the classical wide field microscope and therefore more or less the same optical components can be used. Another advantage is that the illumination and detection are automatically aligned. A further advantage is that by illuminating and viewing with the field of view axis perpendicular to the sample surface the N.A can be large without running into problems such as total reflection.

However, this geometry of conventional confocal microscopy introduces weaknesses and trade-offs that limit the spectrum of applications that can be addressed.

In confocal microscopy, the resolution, i.e. the distance between two distinguishable radiation points, is obtained by limiting the volume (the observation volume) from which emitted light is allowed to reach the detector. Limiting the observation volume is accomplished by combining two approaches: In the dimension orthogonal to the illumination (or equivalent the field of view) axis of the microscope, the extension of observation volume is determined by the focal width in the focal plane of the objective lens. In the dimension along the illumination axis (the field of view axis) of the objective lens, the observation volume is determined by the width of a pinhole placed in the optical conjugate plane in front of the detector. This pinhole is made small enough to block light emanating from points that are outside a certain distance from the focal plane along the direction of the illumination axis. This way, by choosing an objective lens with very small focal width and a small and correctly positioned pinhole, a very high resolution in all three dimensions can be obtained. A further advantage with using the pinhole is that it enhances the contrast since the scattered or fluorescent light emanating from illuminated parts of the sample that are outside the observation volume never reaches the detector.

Nonetheless, in practice this implies a severe trade-off: The pinhole used to filter out the light emanating from outside the focal plane restricts the objective to image more than one point in the focal plane at the time. Thus to obtain an image one has to move (scan) the sample and the observation volume relative to each other. An image synthesized dot by dot and a 1024×1024 frame may take well over a second to accomplish. This complicates the possibility to parallelize the imaging and thus achieve a high throughput.

As mentioned above, the observation volume in conventional confocal microscopy is determined by combining a small focal width with the pin-hole technique. Another way to create an observation volume in three-dimensional space is to use, so called, confocal theta microscopy, Stelzer, E H K, et al. "Fundamental reduction in the observation volume in far-field light microscopy by detection orthogonal to the illumination axis: confocal theta microscopy". Opt Commun. 111, 536-547, (1994). In this technique the observation volume is instead determined by the use of two objective lenses that are placed such that the axes of their fields of view are orthogonal and that their focal planes intersect. The observation volume is thus limited by the focal width of one detector in one direction and by the focal width of the second detector in an orthogonal second direction. The illumination in this case can be arbitrary as long as it illuminates the observation volume under interest.

From an observation volume perspective theta confocal microscopy removes the need for a pinhole. From a contrast perspective, however, the pinhole is needed to suppress light emanating from outside the observation volume that reaches either of the detectors.

Since confocal microscopes are essentially point-by-point measuring devices, an image of a sample is formed by moving the sample volume, containing whatever sample under study, relative the observation volume, defined by the objective lens of the microscope and the pinhole in front of the detector, and measuring a value of the intensity for each point. The motion continues until an entire two-dimensional (x-y) image is gathered, a process that can be repeated to generate a series of images over time. In addition, the observation volume can also be stepped along the microscope axis to acquire a three-dimensional (x, y, and z) image stack of optical sections. With this vector of values an image in three dimensions can be synthesized and is typically tomographically displayed on a screen.

In early versions of confocal microscopes the sample is placed on a high-precision translation stage that moves the sample systematically in three dimensions until the image vector is generated. In order to create a high frame rate the sample has to be moved along its pre-programmed path at high speed while maintaining sub-micro meter precision. A challenging and expensive task due to the high accelerations of the mass of the sample holder and the stages.

Another approach to attain a high frame rate is laser scanning confocal microscope. Instead of moving the sample, the excitation light beam is expanded and directed to a pair of oscillating galvanometer scanning mirrors that raster-scan the focused beam across the sample volume. The light from the sample is de-scanned through the same mirror set and passed through a conjugate (confocal) pinhole before reaching the detector. The scanning speed is limited by the mechanical specifications of the fastest mirror, which typically scans at a rate of approximately 4 to 5 microseconds per image point (sometimes referred to as a pixel or in three-dimensional space a voxel). Thus, for a 512×512 pixel image collected in a single second, the scanning spot dwells on each pixel for about 4 microseconds. Again, obtaining higher rates is very difficult, if not impossible, due to the fact that the mirror would have to be rapidly accelerated, held at a constant velocity while scanning across the field, then rapidly decelerated and the direction of travel reversed, repeating this cycle for each scanned line.

Another alternative for fast scanning of samples is the (Nipkow) spinning disk method. This confocal microscope is based on a circular, rotating disk that has one or more pinhole arrays that are arranged in a spiral pattern designed to cover the sample volume during one revolution of the disk. Since no accelerations are needed other that rotating the disc, this configuration is mechanically very stable in steady state. Another advantage with this method is that despite the pinholes of the spinning disk several points (pixels) can be viewed in parallel. Combining the high speed and the ability to parallelize very high frame rates have been accomplished by using this technique, exceeding 1000 frames per second. Yet, Spinning disk confocal microscopes are not without their artefacts. One limitation is that light, scattered or emitted, from outside the focal plane can reach the detector by traveling through adjacent pinholes, so called pinhole crosstalk. A second limitation is the low percentage of light (often less than 10%) passing through the pinholes of the disk. The remainder of the light is reflected and may show up as background noise in the detector. Both these side effects limit the signal to noise ratio. A third limitation with the spinning disk method is that the detector typically used to collect the image is either a charge coupled device or a CMOS sensor. Since the integration time of such devices are in the order of milliseconds, the dark current inherent in this type of devices will over said integration time build up noise levels making it virtually impossible to detect single photons.

Gratton et al. (U.S. Pat. No. 7,973,294) proposes to move the sample volume through the observation volume. Instead of having an x-y-z translation stage moving around the sample volume, the sample is placed in a container that is rotating. Thus a very large sample volume can be passed through the observation volume of the confocal microscope with a minimum of acceleration required. When in steady state only the friction of the rotation stage has to be overcome and the container can also be slowly moved in other directions in order to access all parts of the sample volume. However Gratton et al. used a cuvette that contains particles resolved in a liquid. Thus the particles are moving around and it is thus not possible to maintain sub-micrometre precision in this case.

There remains a need for techniques that enable studies, tests, etc., of primarily micro-biologically relevant matter, with a high frame rate (high throughput), high spatial resolution in three dimensions, high sensitivity, over a large area and at an acceptable cost level. None of the state of the art methods are able to meet these requirements simultaneously.

SUMMARY

It is an object of the present disclosure to alleviate at least some of the drawbacks associated with the prior art imaging techniques.

A goal of the present disclosure is to enable studies, tests, etc. of primarily micro-biologically relevant matter, with a high frame rate and high spatial resolution in three dimensions at a cost level that allows this method and apparatus based on the invention to make the transition from well-funded research labs to much more general usage in e.g. point-of care applications.

According to the present disclosure, the above objects and goals are met by a novel combination of how the sample volume is transported through the observation volume, how said observation volume is defined, and how the scattered, or fluorescent, light from the sample is collected and detected.

According to aspects illustrated herein, there is provided an apparatus for imaging a sample, said apparatus comprising:
  illumination means for illuminating said sample simultaneously in a line focus or an array of foci; and
  detection means for detecting photons emitted or scattered from a sample simultaneously in an array of fields of view;
  wherein an array of sub-observation volumes in a sample, from which photons are emitted or scattered during imaging, is defined by the volumes in space where the line focus or array of foci from the illumination means overlap with the corresponding array of field of views of the detection means;
  characterized in that the apparatus comprises a sample holder configured to hold the sample at a surface thereof, said sample holder being rotatably arranged such that at least a portion of said sample can be transported through at least one of said sub-observation volumes by rotating the sample holder.

In many applications a high throughput or frame rate is very desirable, e.g. in screening applications or when the dynamics of biochemical reactions are studied. One targeted application of the present invention is to be able to study the biochemistry of cells, including living cells. Since living cells are extremely complex systems it is a very challenging task to discern specific events, such as a specific protein-protein interaction. In order to make such events visible, the proteins under interest are marked with fluorophores that emit light at a specific wavelength when excited by light at another wavelength. By using filters that allow only a specific wavelength or wavelengths to reach the detector, the image produced by the microscope is made up from the fluorescent light instead of the original exciting light. Thus only the marked proteins show up in the image.

Ideally, a fluorophore should be able to be excited and fluoresce an infinite number of times. Unfortunately, the excitation of a fluorophore does not always end up in emission of the desired fluorescence. With some likelihood, the excited molecule instead ends up in a dark state (e.g. the so called triplet state), which disables or radically slows down the return of the molecules to the ground state (so called photobleaching). The transition to the triplet state also renders the molecule toxic to its environment. In order to avoid photobleaching and toxicity it is thus highly preferred to hold the excitation of fluorophores to a minimum. At the same time the amount of fluorescent light in real applications is usually very low. This puts very high demands on the optics, detectors and the signal processing of the detection means. An important parameter in this regard is the so called dwell time. The dwell time is defined as the time that the same part of a sample (specimen) "dwells" within an illuminated voxel. In order to get a high signal-to-noise ratio it is desirable that the dwell time of the instrument exceeds the lifetime of the fluorophore with at least an order of magnitude. This way the fluorophore can be excited and fluoresce many times during the integration time of the detection means.

The apparatus of the present invention preferably comprises a confocal microscopy arrangement with illumination means comprising light sources, a beamsplitter, and a lens arrangement including an objective lens, and detection means comprising one or more pinholes.

The observation volume in the present invention is defined in a way akin to traditional confocal microscopy but with the very important difference that an array of observation volumes is defined by the volumes in space where a line focus or array of foci from the illumination means overlap with a corresponding array of fields of view of the detection means. Each sub observation volume is viewed by the detector separately through separate pinholes of a pinhole array, said pinholes defining the sub-observation volume in the dimension in parallel with the illumination/field of view axis. Below we will sometimes refer to the sub-observation volumes as volume pixels or voxels.

The sample or specimen under investigation is placed in or on a sample holder, which in turn is coupled to a rotation generating organ such that the sample rotates and is made to pass the sub-observation volumes along a well-defined trajectory. The reason for choosing rotation as a means to translate the sample through the observation volume is that the sample then only is subject to fully balanced forces, namely the centrifugal forces, due to the rotation, and centripetal forces, either through adhesion or the normal forces from the sample holder. This in turn enables, a very smooth and well-defined trajectory, the ability to maintain comparably very high speed of the sample relative to the sub-observation volumes, and the ability to image very large sample areas/volumes. The rotation generating organ is preferably configured to rotate the samples at a speed in the range of 1-100 m/s, preferably 5-50 m/s, more preferably 10-30 m/s, relative to the sub-observation volumes.

According to embodiments, the detection means preferably comprises a detection system including an array of pinholes, or optionally optical fibers, for spatially filtering the light from each sub-observation volume, and a fiber bundle forwarding the light to a detector, e.g. an array of avalanche photo diodes run in Geiger mode, and a signal processing unit for processing the signals from the detector.

The detection means may be time-resolved with a detection system rise time equal to or shorter than the time it takes a point in the sample to pass a sub-observation volume. Preferably, the detection means has a detection system rise time of the same order of magnitude as the time it takes a point in the sample to pass a sub-observation, or shorter.

"Rise time" is a widely used measure of the speed of response of a detector or detection system. The term "rise time" generally refers to the time required for a detector output pulse or signal to increase from one specified value of its amplitude to another, often from 10% to 90% of its amplitude. As used herein, the term "rise time" applies to either positive or negative step response, even if a displayed negative step is also sometimes termed "fall time". Accordingly, term "rise time" herein may be replaced by "rise time or fall time".

The rise time of the detection means, or detection system, of the present disclosure is defined as the time it takes for the signal to go from 10% over its initial value to 90% of its final value in response to a sudden rise in incident intensity on the detector. Another measure of the speed of the detection would be in terms of detection system bandwidth, which corresponds to the inverse of the detection system rise time times 0.35.

Because of the motion of the sample through the array of the sub-observation volumes, the sample dwells a limited time, the dwell time, in the sub-observation volume. While in said sub-observation volume that part of the sample is illuminated and said illumination will cause scattering, fluorescence, or similar. Some of that light will subsequently be captured by the detection means and the point in time when the light from certain sub-observation volume is detected corresponds to a certain position in the sample. Thus by having a fast enough time-resolved detection and by making all parts of the sample under interest pass a sub-observation volume at least once, a complete image of the interesting parts of the sample can be obtained at close to diffraction limited resolution.

The detection system rise time of the detection means is preferably chosen as short as the time it takes a part of the sample to traverse a sub-observation volume, i.e. the dwell time, or shorter.

Typically, the detection means have a detection system rise time of 100 ns or less, such as 50 ns or less or 30 ns or less. Preferably, the detection means have a detection system rise time of 10 ns or less.

The maximum risetime preferably allows for obtaining diffraction limited spatial resolution.

However, in applications where only the presence or absence of a fluorophore in a certain position is to be measured, thus counting scarce photons, it is preferred from a signal processing standpoint that the risetime is even shorter, typically an order of magnitude shorter. The explanation for this is that counting in electronics is simpler with steeper flanks. Thus, in some embodiments the detection means have a detection system rise time of 5 ns or less, such as 1 ns or less, or 0.5 ns or less.

Typically, only one or a few photons will reach the detector from a sub observation volume. This means the detection means not only need to be fast but also exhibit a high sensitivity. Preferably, this is accomplished by using avalanche photo diodes in Geiger mode. Such a detector has a very high amplification and can be designed to have a high bandwidth. Typically, the bandwidth will be between 10 MHz and 100 MHz.

In some embodiments, the detection means comprises an avalanche photo diode detector in Geiger mode, preferably a gated avalanche photo diode detector in Geiger mode.

Also, to be able really utilize the rotational mode of motion and at the same time be able to image a large area of a sample, the sample is placed along the vicinity of a surface defined by a constant radius from the rotational axis of the sample holder. The sample holder is therefore preferably cylindrical.

Thus, in some embodiments, the apparatus comprises a cylindrical sample holder configured to hold the sample at the lateral surface thereof, said cylindrical sample holder being rotatably arranged such that at least a portion of said sample can be transported through at least one of said sub-observation volumes by rotating the cylindrical sample holder during imaging. Typically the cylindrical sample holder may have a circumference in the range of 5-30 cm, such as about 10 cm. The cylindrical sample holder may generally have a height, (i.e. the width of the lateral surface) in the range of 1 to 50 cm, but smaller as well as larger cylinders are also contemplated. In some preferred embodiments the cylindrical sample holder has a height in the range of 5 to 20 cm, such as in the range of 5 to 15 cm.

In embodiments of the present invention the sub-observation volumes are fixed relative to the microscope objective and the motion is accomplished by rotating the sample relative to these fixed sub-observation volumes. As an example, having a fast detector with a bandwidth of 30 MHz, corresponding to a detector rise time of about 10 ns, and translating the sample by means of rotation with a speed of 20 m/s allows for in the order of 1000 times the number of image points, compared with the current state of the art, to be accomplished with one single avalanche photo detector (APD) in Geiger mode.

With M detectors a further factor of M image points per second is possible. Thus, including rotation as the means of motion the present invention enables a dramatic increase in throughput of the device.

In order to cover a larger area/volume, the plurality of foci is preferably arranged as an array of equidistant foci, either a linear array or preferably a two-dimensional array. The distance between two subsequent foci is preferably much larger than the width of the individual foci. The trajectory of motion (the motion vector) of the sample is then chosen such that preferably each relevant part of the sample under investigation passes a sub-observation volume at least once. This is in two dimensions accomplished by choosing a suitable angle between a virtual line drawn along one such row of sub-observation volumes in the array and the motion vector of the sample. In the third dimensions this is, preferably, accomplished by choosing the motion vector of the sample while being transported through the observation volume non-perpendicular to the normal vector of a virtual plane drawn through the array of sub-observation volumes. It may be added that the distances between rows and the columns not necessarily are the same.

In some embodiments, said array of sub-observation volumes is arranged in at least one row of, preferably equidistant, observation volumes. The angle between a virtual line drawn along said at least one row of sub-observation volumes and the motion vector of a sample being transported through at least one of the sub-observation volumes of the row is preferably more than zero.

In some embodiments, said array of sub-observation volumes is arranged in a planar grid of, preferably equidistant, observation volumes. The normal vector of a virtual plane of said grid of sub-observation volumes and the motion vector of a sample being transported through at least one of the sub-observation volumes of the row are preferably non-perpendicular.

The illumination means may comprise one or more light sources, preferably one or more laser diodes. The illumination means may for example further comprise a micro lens array for illuminating said sample simultaneously in an array of foci.

For optimal imaging performance the precision of the sample trajectory is an important parameter and particular attention should be paid to how the rotation is generated and maintained. State of the art ball bearings, e.g., may not be good enough. Instead air-bearings are a preferred solution. In some embodiments, the sample is arranged at a near constant radial distance from a rotational axis of the sample holder during rotation. In some embodiments, the sample holder is suspended by an air bearing.

In some embodiments, the apparatus further comprises means for measuring the relative, tangential and/or radial, position between the sample and the array of sub-observation volumes at least once per rotational lap of the sample holder in order to correlate the detected signals with the corresponding absolute position within the sample. It will often be of interest to know the precise position of the sample relative to the array of sub-observation volumes as a function of time. Not only between consecutive laps but also during a single lap. The precision should preferably be in the order of 0.1 micrometres. Rotational motion has the distinct advantage that it enables a very smooth trajectory of the sample through the sub-observation volumes. Still, even with precision air bearings it may not be possible to get a smooth enough motion to meet the abovementioned precision in position. For that very reason it may be useful to introduce means to measure the relative position of the sample and the array of sub-observation volumes and use this data to map the signals generated in the detection means so that they correlate to the correct position in the sample as a function of space and time. This is preferably accomplished in several steps gradually increasing the accuracy. The first step is to measure the relative angular position of the rotating sample holder and the fixed illumination system. This data can both be used to generate the correction signal needed to map the detection means signals to the correct angular position and to regulate the angular velocity of the sample holder. The second step is to measure the radial deviations in position of the rotational axis of the sample holder from the ideal position and use that data to generate a correction signal needed to map the detection signal to the correct position in the radial dimension. Finally, by comparing images between laps a third correction signal may be generated to even further improve the mapping.

In some embodiments, the cylindrical sample holder is movably arranged along its rotational axis such that the sample holder and samples can be transported along the rotational axis of the sample holder during rotation. By arranging the sub-observation volume array such that the sub-observation volumes are evenly distributed over the whole field of view of the microscope and with the motion arranged as mentioned above, makes it possible to image a 250 micrometre wide strip per lap. By gradually translating the sample holder along the axis of rotation and using a rotation frequency of 50 Hz an area in the order of 10 square centimetres can be imaged per second. This allows for unprecedented imaging and analysis of e.g. large tissue samples for pathology applications.

In some embodiments, the cylindrical sample holder comprises a sample container holder and a detachable plate-like sample container configured to be wrapped around and attached to the sample container holder. In some embodiments, the cylindrical sample holder comprises grooves, wells, or the like for holding the sample. In some embodiments, the cylindrical sample holder further comprises a lid in the form of a thin plate or film covering said grooves, wells or the like in order to contain the sample therein, said lid preferably having a refractive index close to that of water.

In some embodiments, the apparatus further comprises a coating device arranged in close proximity of the outward facing surface of the cylindrical sample holder for spreading a liquid layer on the surface during rotation. In some embodiments, the coating device is formed by a microscope slide attached to a microscope objective, wherein the microscope slide is arranged in close proximity of the outward facing surface of the cylindrical sample holder.

According to other aspects illustrated herein, there is provided a method of imaging a sample comprising:

a) providing a sample to be imaged at the surface of a rotatably arranged sample holder;

b) illuminating said sample simultaneously in a line focus or an array of foci and detecting photons emitted or scattered from a sample simultaneously in an array of fields of view such that an array of sub-observation volumes in the sample, from which photons are emitted or scattered during imaging, is defined by the volumes in space where the line focus or array of foci from the illumination means overlap with the corresponding array of field of views of the detection means; and c) transporting at least a portion of said sample through at least one of said sub-observation volumes by rotating the sample holder during imaging.

The method may advantageously be performed in an apparatus as described hereinabove, and features and advantages described with reference to the apparatus are equally applicable to the method.

In some embodiments, said detection has a detection system rise time of the same order of magnitude as the time it takes a point in the sample to pass a sub-observation, or shorter.

In some embodiments, said sample holder is cylindrical and the sample to be imaged is arranged at the lateral surface of the cylindrical sample holder.

In some embodiments, the samples are rotated at a speed in the range of 1-100 m/s, preferably 5-50 m/s, more preferably 10-30 m/s, relative to the sub-observation volumes.

In some embodiments, said array of sub-observation volumes is arranged in at least one row of, preferably equidistant, observation volumes. The angle between a virtual line drawn along said at least one row of sub-observation volumes and the motion vector of a sample being transported through at least one of the sub-observation volumes of the row is preferably more than zero.

In some embodiments, said array of sub-observation volumes is arranged in a planar grid of, preferably equidistant, observation volumes. The normal vector of a virtual plane of said grid of sub-observation volumes and the motion vector of a sample being transported through at least one of the sub-observation volumes of the row are preferably non-perpendicular.

In some embodiments, detection is made using an avalanche photo diode detector in Geiger mode, preferably a gated avalanche photo diode detector run in Geiger mode.

In some embodiments, the sample is arranged at a near constant radial distance from a rotational axis of the sample holder during rotation. In some embodiments, the sample holder is suspended by an air bearing.

In some embodiments, the method further comprises measuring the relative, tangential and/or radial, position between the sample and the array of sub-observation volumes at least once per rotational lap of the sample holder in order to correlate the detected signals with the corresponding absolute position within the sample.

In some embodiments, the samples are transported along the rotational axis of the cylindrical sample holder during rotation.

The thickness of the sample arranged on the sample holder may generally be up to about 250 µm, and more typically up to about 150 µm, such as up to about 100 µm or up to about 50 µm. The thickness of the sample arranged on the sample holder will generally be above 1 µm, typically above 5 µm.

In some embodiments the sample comprises organic material. In some embodiments the sample comprises biological material. In some embodiments the sample comprises one or more cells, for example living cells.

In some embodiments, the method further comprises spreading a liquid layer on the outward facing surface of the cylindrical sample holder during rotation.

Other aspects and preferred embodiments of the present invention will be evident from the following detailed description and the appended claims.

BRIEF DESCRIPTION OF THE DRAWINGS

In the detailed description that follows below, reference will be made to the accompanying drawings, on which FIG. 1 schematically shows the general set-up of an apparatus according to embodiments of the invention.

DETAILED DESCRIPTION

Figure 1:
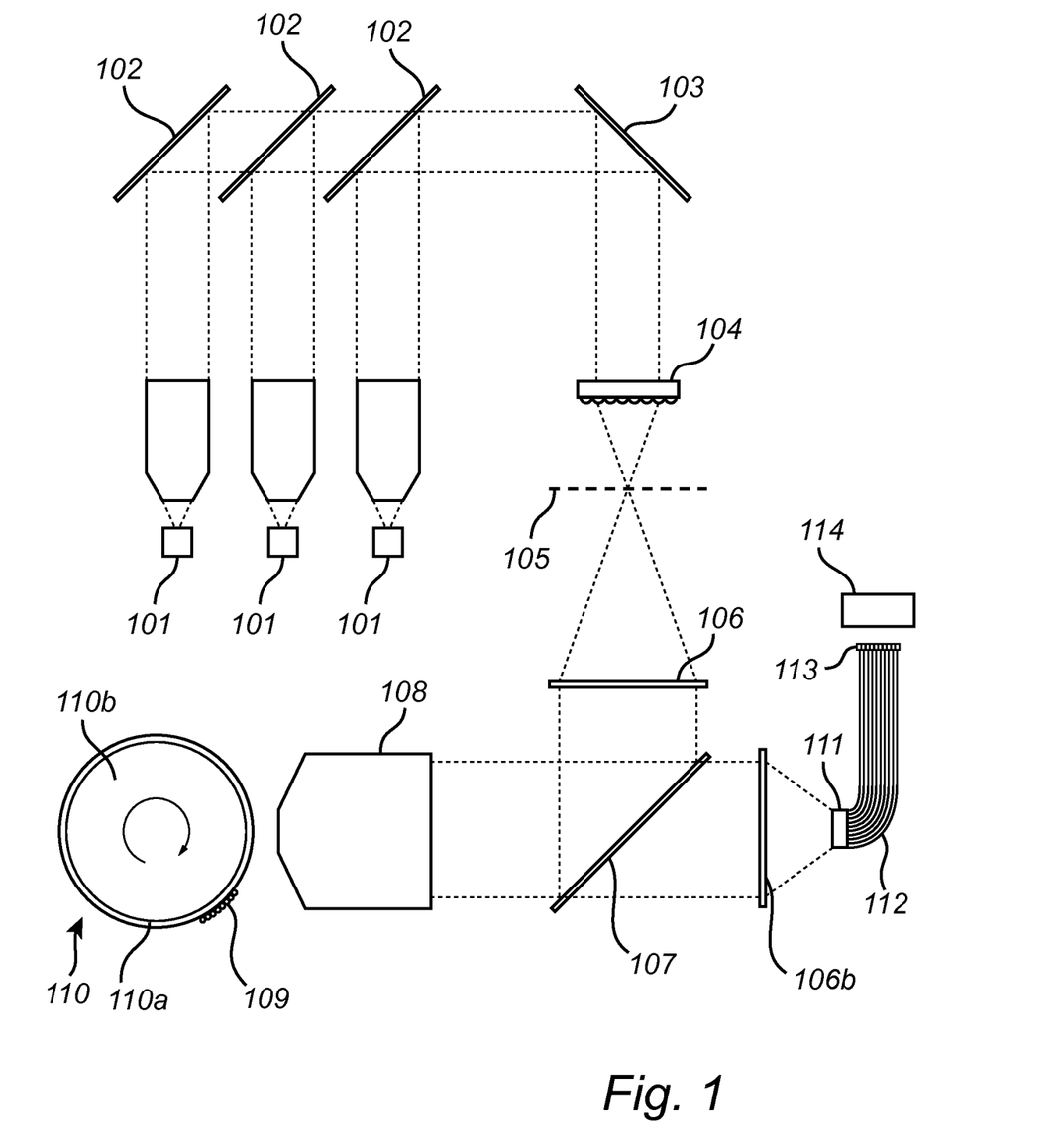

An embodiment of the invention is schematically depicted in FIG. 1. Collimated light beams from one or more light sources 101, preferably laser diodes, are via dichroic beamsplitters 102 united into the same optical beam. Said collimated beam is then made incident, optionally via a mirror 103, on a micro lens array 104, generating an array of foci in the focal plane 105 on the other side of said micro lens array. A tube lens 106 with focal length ft is placed with its focal plane coinciding with the focal plane of the micro lens array 104. Said tube lens thus generates a corresponding array of collimated beams at different angles. This array of collimated beams is then reflected against a 45 degree angled second dichroic mirror 107 and subsequently made incident on an objective lens 108. Said objective lens is preferably placed such that the aperture of the said objective lens is placed at the focal plane of the tube lens 106. This way the maximum light falls within the aperture of the objective lens 108. The passage of the light through the objective lens generates an array of foci that defines the sub-observation volumes in the volume where the rotating sample 109 under investigation passes by. The number of sub-observation volumes can easily be made to reach a hundred or even a thousand, thus allowing for a massive parallelisation of the confocal microscope.

Scattered or fluorescent light from the sub observation volumes in the illuminated sample 109, arranged on the sample holder 110 optionally composed of a sample container 110a and sample container holder 110b, is then collected by the same objective lens 108 and will collimated pass again through the second dichroic mirror 107. A second tube lens 106b then generates an image of the sub-observation volumes on an array of pinholes 111 (or optionally optical fibers), spatially filtering the light before the light from each sub-observation volume, via a fiber bundle 112, is made incident on a detector 113, preferably an array of avalanche photo diodes run in Geiger mode. The signals from the detector 113 are processed in a signal processing unit 114.

The laser diodes used for generating the illumination light can either be run in continuous wave mode or in pulsed mode depending on the application. If the illumination light is used to excite fluorophores, pulsed light is sometimes advantageous. Further it is beneficial to choose high power diode lasers. Such lasers, however, typically exhibit multi-mode behaviour in one direction. To avoid that said multi-mode behaviour deteriorates the image quality it is the advantageous to collimate the laser beams to a large diameter beam. The collimation of the laser diodes is preferably accomplished by objective lenses. The reason for collimating to a large diameter beam is that the images of the lasers then fall within the diffraction limit of the microlenses in the focal plane of said micro lens array and is thus viewed as a point source by the tube lens. In other words the microlenses also act as spatial filters.

The functionality of the, so called, microlens array is essentially to accomplish an array of virtual point sources in the focal plane of the subsequent tube lens. Said function can be accomplished in a number of ways. One way is to use micro lens arrays, essentially plates in which an array of small lenses have been integrated. Another way is to use two sets of orthogonally oriented cylinder lenses in sequence that share a common focal plane. That way it is possible to tune the distance between foci in the observation volume.

Figure 2A:
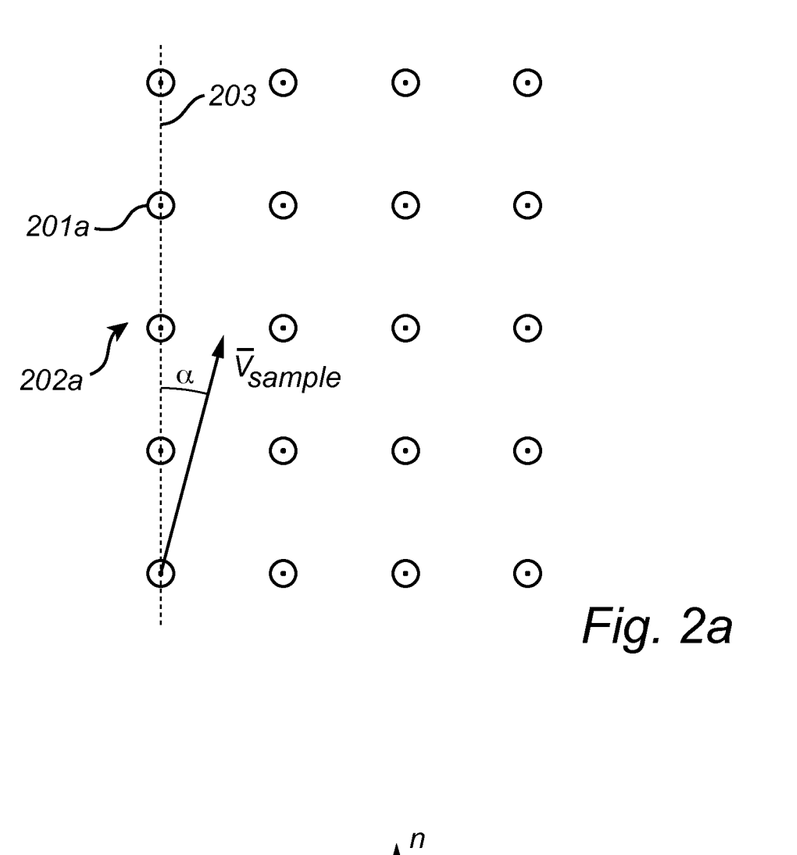
FIGS. 2a and 2b schematically illustrate how illumination and detection cooperatively define an array of sub-observation volumes in accordance with embodiments of the invention.
Figure 2B:
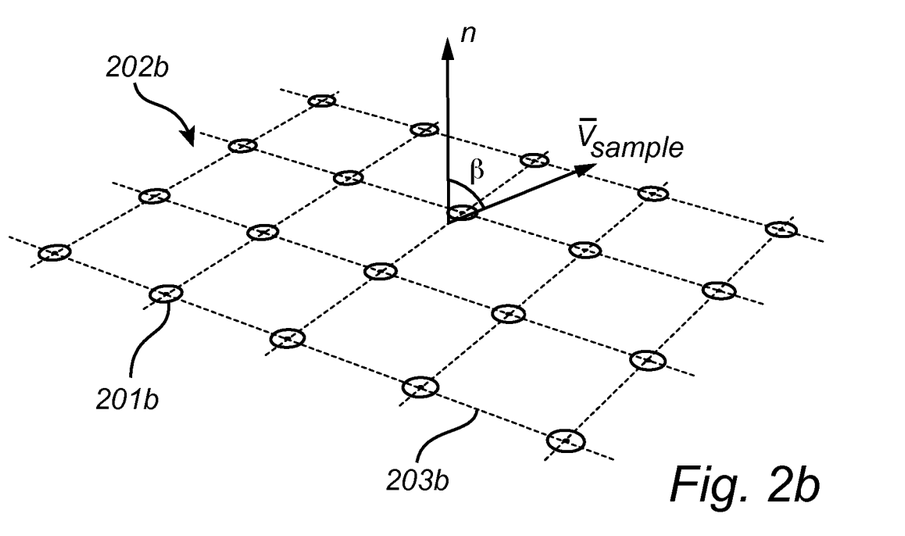

The optical set-up thus creates a linear or a two-dimensional array of sub-observation volumes (voxels) as schematically illustrated in FIGS. 2a and 2b. In FIG. 2a a linear array of sub-observation volumes 201a is arranged in at least one row 202a of, preferably equidistant, observation volumes. The angle "a" between a virtual line 203a drawn along said at least one row of sub-observation volumes and the motion vector "$v_{sample}$" of a sample being transported through at least one of the sub-observation volumes of the row is greater than zero. In FIG. 2b a two-dimensional array of sub-observation volumes 201b is arranged in a planar grid 202b of, preferably equidistant, observation volumes. The normal vector "n" of a virtual plane 203b of said grid of sub-observation volumes and the motion vector "$v_{sample}$" of a sample being transported through at least one of the sub-observation volumes of the row are non-perpendicular.

Since the sample is moving through the array of voxels different parts of the sample will be observed at different times. Each voxel pans through many orders of magnitude larger volumes than covered by the voxels (sub-observation volumes) themselves. Thus, by combining a high bandwidth time-resolved detector with a matched high translation speed of the sample under investigation a very large number of points in the sample can be imaged or analysed.

As outlined above the sample is made pass through the observation volume by means of rotation. This arrangement serves to accomplish several advantageous properties. Once the sample holder has been brought to the desired rotation rate and this rate is kept constant, the only forces acting on the sample is the centrifugal force and the normal forces acting on the sample by the inner walls of the holder, that is if the sample is placed on the inside of the sample holder. If the sample instead is placed on the outside of the sample holder, the only forces are the centrifugal force and adhesion forces between the sample and the sample holder. Such adhesion forces are surprisingly large and as long as the sample layer is thin, rotation rates well over 3000 rpm are still possible. The sample is thus kept in a state of mechanical equilibrium in a controlled position. Further, rotation as a means of motion is advantageous in terms of precision. By using state of the art bearing technology and by carefully balancing the sample holder, a very controlled trajectory of the sample can be accomplished. In steady state, i.e. at constant rotation rate, the position of the sample container holder when passing through the observation volume can be controlled well within the size of a single voxel, i.e. in order of the half a wavelength of the detected light.

In a preferred embodiment of the invention, the rotation of the sample holder is accomplished by the following arrangement: A rotation generating organ, typically an electrical brushless DC motor, transmits the angular momentum of its rotor shaft, preferably through inductive or magnetic forces, to the sample holder bringing said sample holder to rotate with the same rate. The sample holder, preferably made of metal or glass, is ideally a hollow or solid cylinder, i.e. a tube or a rod. In order to enable a smooth and precise rotation it is preferred that said sample holder is designed and manufactured such that it is symmetrical around an axis along its length and that the mass is evenly distributed in all radial directions from the axis.

Also to ensure a smooth and repeatable rotation around its axis, the rotating sample holder is kept in position by a bearing, preferably an air bearing or an electrodynamic bearing to realize a contactless suspension, said bearing being assembled between said rotating sample holder and an inner or outer fixed fitting.

In some embodiments, the cylindrical sample holder comprises grooves, wells, or the like for holding the sample. In some embodiments, the cylindrical sample holder further comprises a lid in the form of a thin plate or film covering said grooves, wells or the like in order to contain the sample therein, said lid preferably having a refractive index close to that of water. In some embodiments, the sample holder is composed of a sample container holder and a detachable sample container. The sample container may typically be plate-like, and configured to be wrapped around and attached to the sample container holder.

A part of the sample holder may extend outside the fitting making the same accessible to manual or automated attachment of the sample container or to the sample directly.

A sample holder can be designed in a plethora of ways. However, the sample container should ideally, be easily attached to the sample container holder, be shaped in a way such that it does not offset the center of gravity of the sample holder, be chemically inert, provide protection of the samples or specimens, and be compatible with the standard procedures of the assays of the industry.

In one embodiment of the invention the sample container comprises a plate-like organ. The thickness of said organ is chosen such that the organ without running the risk of breaking can be bent to the same radius as the outer surface of at least a part of the sample container holder. One side of the plate-like organ may be equipped with a pattern of wells, grooves, ridges or similar where samples or specimens could be fitted and/or for flushing the sample with liquids to perform assays.

In one embodiment the sample is placed facing outward from the rotation axis and is held in place by adhesion forces between the sample and the sample container.

In yet another embodiment, on said plate-like organ an optically transparent thin plate or film, of preferably an inert polymer, is attached as a lid on the patterned side of the plate-like organ to enclose and protect the samples or specimens that have been placed on the same. Another function of the lid is to serve as the outermost layer providing the normal forces on the sample when the sample is pushed outwards by the centrifugal forces due to rotation. A third function of the polymer lid is to minimize reflections between the samples or specimens and the sample container.

Figure 3A:
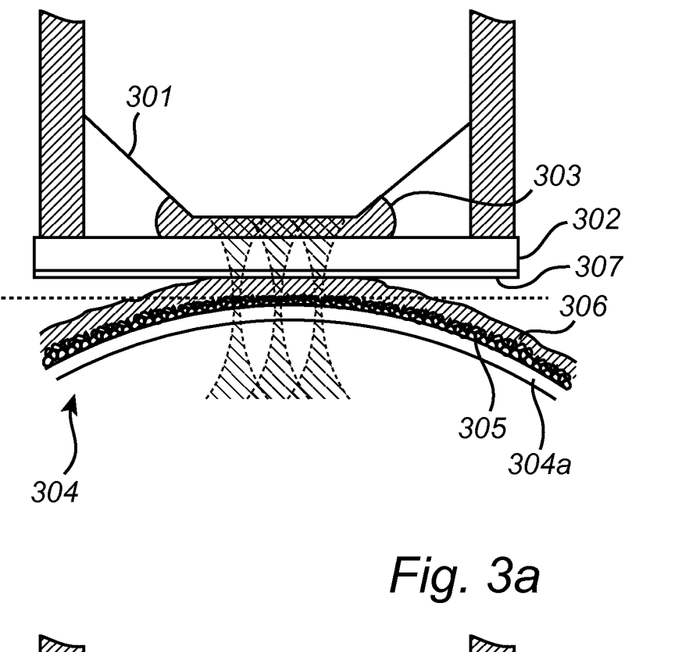
FIGS. 3a and 3b schematically show a magnified view of an inventive arrangement for probing a sample.

In one embodiment the lid is chosen in a material with a refractive index close to the refractive index of water, e.g. cytop. In another embodiment the lid is chosen to be close to the same refractive index as the refractive index of the microscope slide 302.

From the above it is obvious that a large numerical aperture (N.A.) of both the illumination means and the detection means is preferred to obtain high resolution imaging. A further advantage of a large N.A. is that it increases capability of the detection means to capture light scattered or emitted from the sample under investigation. Considering the low levels of light that may need to be detected, especially in fluorescence spectroscopy applications, this may be important. A high N.A, however introduces a challenge since this means that light entering from the illumination means into the sample volume and light scattered or emitted from the sample volume needs to be able to do so at large angles relative to the normal vector of the surface of the rotating sample holder. This means that, unless coupling is somehow alleviated, light will be lost due to reflection. Means may preferably be introduced to facilitate the coupling of light to and from the sample container at large angles.

One embodiment of the optical coupling means is depicted in FIG. 3a. Light leaving the objective lens 301 will at the exit surface of said objective lens be subject to a refractive index change. Objective lenses can be designed to minimize the reflections and aberrations due to this refractive index change and in a preferred embodiment, the objective lens is designed for the external refractive index being approximately that of water. At a distance, well within the working distance of the objective, a microscope slide 302, i.e. a flat piece of glass, quartz or other transparent material, is fixed to the objective lens 301. A drop of immersion oil 303, with an refractive index close to that of water is made fill the space between the exit surface of the objective lens 301 and the slide 302. The rotating sample holder 304 is then positioned such that the sample 305, arranged at the sample container 304a of the sample holder 304, passes the sub-observation volumes as mentioned above in close vicinity to the slide 302. The sample is subsequently covered with a liquid layer 306, of water or a liquid of a refractive index close to water, such that said microscope slide may slide on said liquid layer during rotation of the sample. Said liquid layer 306 is accomplished by depositing a suitable amount of said liquid on the sample. Due to the rotation of the sample the liquid drop will disperse to form a strip like layer surrounding the cylindrical sample holder 304. To avoid that the said liquid layer strip narrows further and gradually falls off the rotating sample, the liquid layer strip is further dispersed by a coating device, to form a broader and thinner strip of liquid surrounding the sample holder. Said liquid coating device can either be attached to the objective or placed somewhere in proximity to the outward facing surface of the rotating sample. In a preferred embodiment (as shown in FIG. 3a) the liquid coating device consists of the fixed slide 302 mounted on the objective 301. In another embodiment the liquid coating device consists of a fine brush.

The resulting even liquid layer serves as a refractive index match between the objective and the sample and thus reduces spurious scattering of either the illuminating light or the desired light signal to be detected that would otherwise significantly blur the image. Furthermore, said liquid layer keeps the sample from drying out.

To minimize the friction between the fixed slide 302 attached to the objective 301 and the rotating liquid layer 306 on top of the sample, the surface of the slide facing the water is preferably covered with a thin hydrophobic layer 307, e.g. a layer of Cytop. The microscope slide creates a slight parallax of the beam but this can also be compensated for by choosing the right microscope objective matched to the thickness of said microscope slide.

Figure 3B:
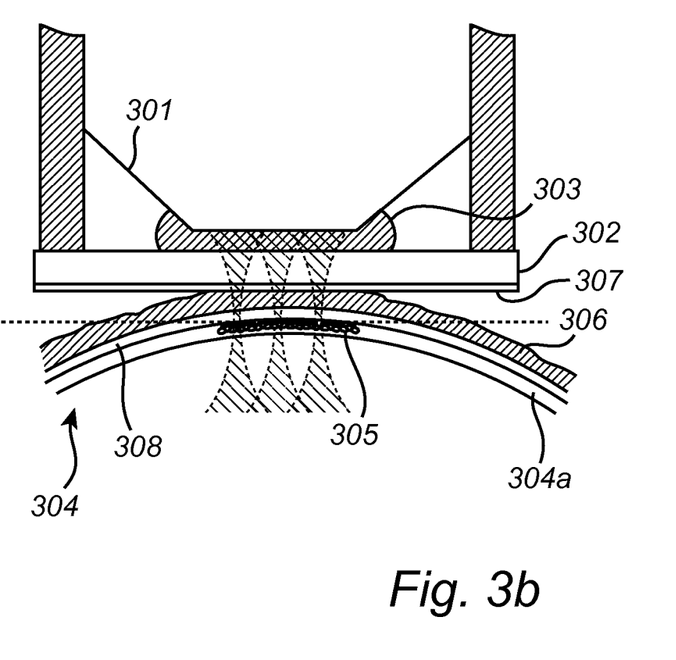

In another embodiment, depicted in FIG. 3b, the sample 305 instead of facing the liquid layer 306, is covered by a lid 308 keeping the sample in place. The lid 308 is preferably made of plate with a refractive index preferably close to that of water and with a thickness such that it can easily be bent around the sample holder 304. The set-up is otherwise the same as the one depicted in FIG. 3a. The liquid layer is deposited in the same way as mentioned above but now on the outer surface of the lid 308.

As mentioned above the trajectory of motion of the sample relative to the array of sub observation volumes is preferably chosen such that there is suitable angle between a virtual line drawn along one such rows of sub-observation volumes in the array and the motion vector of the sample. And if desired, accordingly in the third dimensions, i.e. the depth dimension of the sample, this is may be accomplished by choosing the motion vector of the sample while being transported through the observation volume at a suitable angle that is non-perpendicular to the normal vector of a virtual plane drawn through the array of sub-observation volumes. This requires that the axis of rotation of the rotating sample holder can be turned relative to the axes of the sub-observation volume array and that the axis of the objective lens is can be tilted relative to the normal vector of the sample holder. Preferably, the apparatus includes means to adjust these angles.

In yet another embodiment, the depth dimension may be covered by varying the distance between the objective and the sample. However then the depth cannot be covered in one passage but has to be covered in consecutive laps of the rotation.

As mentioned earlier, in a preferred embodiment the detector is an avalanche photo diode detector (APD) operating in Geiger mode. APDs are sometimes also referred to as SPADs (Single Photon Avalanche Diodes). This is especially important when fluorescence markers are used to accomplish specificity. In such applications the compound likelihood that a photon from a fluorophore within a voxel is detected is rather small. A way to increase this likelihood is to increase the dwell time, i.e. the time that the fluorophore dwells within an illuminated voxel. This way the fluorophore can be excited and fluoresce an increased number of times and thus the likelihood of detecting a photon increases. However, as also discussed above, increasing the dwell time reduces the throughput and although this to can be compensated for by increasing the degree of parallelization there is a limit to this approach. Increasing the dwell time also means increasing the integration time of the detection means, which means that we are increasing the dark counts of the detector including the amplifier stage. In fact the noise level increases linearly with the integration time. An APD in Geiger mode has a very large internal amplification (often in the order of than $10^6$) and this means that even single photons give rise to a strong signal. In some embodiments the dwell time is chosen to be about 100 ns. The likelihood of one photon being detected during this time is about one. Since it is known within less than 100 ns when the photon will arrive the integration time only needs to be of that order or less. Thus the integrated noise will be relatively low. In a spinning disc the with a frame rate of 1 kHz the integration time needs to be 10000 times longer with a much lower amplification, pinhole cross talk, etc. Thus the approach of the present invention is superior in applications with low light levels.

A possible drawback of using an APD in Geiger mode is that the response is not linear with the amount of light reaching the detector. This means that there is no grayscale in the imaging. Each voxel is either black or white. However, in the applications targeted this is not a problem. The inventive apparatus determines if a molecule, fluorophore, etc is present in the voxel or not.

When run in Geiger mode the APD is operated with a reverse voltage above the APD's breakdown voltage. As a result, the amplification can be as high a 10 to the power of 6. However, by lowering the reverse voltage a few Volts below the breakdown voltage the amplification of the amplification drops to less than 1. In fact, a Geiger mode operated APD needs to have its signal current limited and quickly diminished. The reason is that once triggered, the avalanche final current keeps on flowing, thus rendering the device useless for subsequent detections. The avalanche process must therefore be stopped and after that the device must be brought back into its quiescent state. Both active and passive current quenching techniques are in a preferred embodiment being used for this purpose.

In some embodiments of the invention, the signal to be detected originates from a single laser pulse. In these cases, the signal is present only in a well-defined interval after the laser pulse, so it can be convenient to activate the detector only in this time interval. Moreover, in the case of laser induced fluorescence, the laser pulse can be so intense as to completely drown out the signal. Again, the diode can be kept inactive in the presence of the laser pulse, and reactivated immediately afterwards. This mode of operation is called gated mode, and consists in keeping the bias voltage below breakdown, and increasing it to the desired level for a well-defined period of time coincident with the expected signal arrival.

Another goal of the invention is to keep the workflow simple when using the method or device. The imaging of a sample is typically only one step of many in an assay. In most assays, prior to imaging, the sample has passed a number of preparation procedures, such as amplification, precipitation, washing, etc. In industrial applications such assays are automated procedures using plates, dishes, microarrays, or some other type of sample container, to effectively confine and transport the samples through parts the process. Said sample containers often comprise a large numbers of systematically arranged wells to be able to test many targets (analytes) and reagents in a multitude of combinations. In many laboratories there is a large installed base of equipment that cater for the automation of the assays and it is thus an advantage if the sample container used in the present invention adhere to these standard procedures. To this end in embodiments of the invention the samples are placed on a planar or plate-like sample container. Said sample container is preferably made of a material or combination of materials and with appropriate dimensions to be flexible enough to be attached on a sample container holder such that it follows the curvature or shape of the sample container holder. This way the sample container can be made compatible with standard preparation procedures when in planar form and then assume the shape of the sample container holder to comply with the intentions of the present invention.

Another significant advantage with the present invention is that it takes a snapshot, an on-the-spot record, of the intensity from a voxel or set of voxels in the observation volume. Unlike the current state of the art there is no need to record a temporal profile of the intensity while the sample is in the observation volume. This means that the speed with which sample passes the observation volume can be made orders of magnitude higher than what has been possible to date. (Typically the rotation rate will be in the order of 100 revolutions per second and the speed of the sample passing the observation volume in the order of a few meters to tens of meters per second). By moving the sample volume through the observation volume with high speeds, typically 10 m/s, the invention hence enables screening of a large sample volume compared to the current state of the art, e.g. conventional confocal microscopy.

An additional advantage provided by the present invention is does not require any pattern recognition algorithm for receiving or analysing the detected signal. Since the position of each voxel is known as a function of time and the intensity of the light from each voxel is detected momentarily, the data generated represents a high resolution three-dimensional map of the whole volume that has passed through the observation volume.

The high precision of the rotation where the same volume may be observed lap after lap, enables consecutive observation of the motion (at least statistically) of the particles in the cell or in a solution. The motion could be due either random walk, due to the centripetal forces or due to an applied electrical field. Very important information about the sample or specimen can be deduced from the motion data and in particular from the lack of motion.

A further clear advantage with the present invention compared to the prevailing state of the art methods using CCD or CMOS sensors is the improved optical power budget. In order to get the maximum number of fluorescent photons from a fluorophore, which is crucial in low-concentration applications, it is often necessary to saturate the fluorophore with excitation light (illumination light). This means that as soon as an excited fluorophore emits a photon it will most likely immediately be excited again. This way the fluorophore will emit the maximum number of photons. In the present invention the detection means only views a limited volume, the compound sub-observation volumes, at the time. It is also during this same time only said compound sub-observation volume that is illuminated. The required total power of the light source used for illumination is thus the power required to saturate the fluorophores in a single sub-observation volume times the number of sub-observation volumes used. With say 100 sub-observation volumes and a saturation power of roughly 0.5 mWatts per sub-observation volume, the power of the illumination source needs to be about 1 Watt including a 50% loss. In the state-of the art case of imaging, with a perhaps 1 million pixel CMOS or CCD sensor, to attain saturation would require a power of 1 kW. This requires much more expensive light sources and complex cooling arrangements.

The person skilled in the art realizes that the present invention by no means is limited to the preferred embodiments described herein. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. An apparatus for imaging a sample, said apparatus comprising:
   a light source configured to illuminate said sample simultaneously in a line focus or an array of foci; and
   a sensor configured to detect photons emitted or scattered from a sample simultaneously in an array of fields of view;
   wherein an array of sub-observation volumes in a sample, from which photons are emitted or scattered during imaging, is defined by volumes in space where the line focus or array of foci from the light source overlap with the corresponding array of field of views of the sensor;
   wherein the apparatus comprises a cylindrical sample holder comprising a longitudinal axis and an outward facing lateral surface radially symmetric around the longitudinal axis, said cylindrical sample holder being configured to hold the sample at a cylindrical portion of the lateral surface, said cylindrical sample holder being rotatably arranged such that at least a portion of said sample can be transported through at least one of said sub-observation volumes by rotating the cylindrical sample holder around the longitudinal axis; and
   wherein central axes of the line focus or array of foci from the light source and the corresponding array of field of views of the sensor are substantially parallel.

2. The apparatus according to claim 1, wherein said sensor has a detection system rise time of the same order of magnitude as the time it takes a point in the sample to pass a sub-observation volume, or shorter.

3. The apparatus according to claim 1, wherein said array of sub-observation volumes is arranged in at least one row of observation volumes.

4. The apparatus according to claim 3, wherein the angle between a virtual line drawn along said at least one row of sub-observation volumes and a motion vector of a sample being transported through at least one of the sub-observation volumes of the row is greater than zero.

5. The apparatus according to claim 3, wherein said array of sub-observation volumes is arranged in at least one row of equidistant observation volumes.

6. The apparatus according to claim 1, wherein said array of sub-observation volumes is arranged in a planar grid of observation volumes.

7. The apparatus according to claim 6, wherein a normal vector of a virtual plane of said grid of sub-observation volumes and a motion vector of a sample being transported through at least one of the sub-observation volumes of the row are non-perpendicular.

8. The apparatus according to claim 6, wherein said array of sub-observation volumes is arranged in a planar grid of equidistant observation volumes.

9. The apparatus according to claim 1, wherein said light source comprises a micro lens array.

10. The apparatus according to claim 1, wherein said sensor comprises a pinhole array, or an array of optical fibers.

11. The apparatus according to claim 10, wherein each sub-observation volume is viewed by the sensor separately through separate pinholes or optical fibers of the pinhole array or optical fiber array, said pinholes or optical fibers defining each sub-observation volume in a dimension in parallel with the line focus or array of foci of the light source.

12. The apparatus according to claim 1, wherein said sensor comprises an avalanche photo diode detector in Geiger mode.

13. The apparatus according to claim 12, wherein the avalanche photo diode detector in Geiger mode is a gated avalanche photo diode detector run in Geiger mode.

14. The apparatus according to claim 1, wherein the sample is arranged at a near constant radial distance from a rotational axis of the sample holder during rotation.

15. The apparatus according to claim 1, wherein the sample holder is suspended by an air bearing.

16. The apparatus according to claim 1, further configured to measure a relative, tangential and/or radial position between the sample and the array of sub-observation volumes at least once per rotational lap of the sample holder in order to correlate the detected signals with a corresponding absolute position within the sample.

17. The apparatus according to claim 1, wherein the cylindrical sample holder is movably arranged along its rotational axis such that the sample holder can be transported along the rotational axis of the sample holder during rotation.

18. The apparatus according to claim 1, wherein the cylindrical sample holder comprises a sample container holder and a detachable plate-like sample container configured to be wrapped around and attached to the sample container holder.

19. The apparatus according to claim 1, wherein the cylindrical sample holder comprises grooves, wells, or the like for holding the sample.

20. The apparatus according to claim 19, wherein the cylindrical sample holder further comprises a lid in the form of a thin plate or film covering said grooves, wells or the like in order to contain the sample therein.

21. The apparatus according to claim 20, wherein said lid has a refractive index close to that of water.

22. The apparatus according to claim 1, further comprising a coating device arranged in close proximity of the outward facing surface of the cylindrical sample holder for spreading a liquid layer on the surface during rotation.

23. The apparatus according to claim 1, wherein said line focus or array of foci are an optical line focus or an optical array of foci, wherein said optical line focus or optical foci are a line or points of converging light, and wherein central axes of the optical line focus or array of optical foci from the light source and the corresponding array of field of views of the sensor are substantially parallel.

24. An apparatus for imaging a sample, said apparatus comprising:
   a light source configured to illuminate said sample simultaneously in a line focus or an array of foci;
   a sensor configured to detect photons emitted or scattered from a sample simultaneously in an array of fields of view; and
   a coating device arranged in close proximity of the outward facing surface of the cylindrical sample holder, said coating device configured to spray a liquid layer on the surface during rotation;
   wherein an array of sub-observation volumes in a sample, from which photons are emitted or scattered during imaging, is defined by volumes in space where the line focus or array of foci from the light source overlap with the corresponding array of field of views of the sensor;
   wherein the apparatus comprises a cylindrical sample holder configured to hold the sample at the lateral surface thereof, said cylindrical sample holder being rotatably arranged such that at least a portion of said sample can be transported through at least one of said sub-observation volumes by rotating the cylindrical sample holder; and wherein central axes of the line focus or array of foci from the light source and the corresponding array of field of views of the sensor are substantially parallel, wherein the coating device is formed by a microscope slide attached to a microscope objective, wherein the microscope slide is arranged in close proximity of the outward facing surface of the cylindrical sample holder.

25. A method of imaging a sample comprising:
a) providing a sample to be imaged at the surface of a rotatably arranged sample holder, wherein said sample holder is cylindrical and comprises a longitudinal axis and an outward facing lateral surface radially symmetric around the longitudinal axis, and wherein the sample to be imaged is arranged at a cylindrical portion of the lateral surface;
b) illuminating said sample simultaneously in a line focus or an array of foci and detecting photons emitted or scattered from a sample simultaneously in an array of fields of view such that an array of sub-observation volumes in the sample, from which photons are emitted or scattered during imaging, is defined by the volumes in space where the line focus or array of foci from the light source overlap with the corresponding array of field of views of the sensor, wherein the central axes of the line focus or array of foci from the light source and the corresponding array of field of views of the sensor are substantially parallel; and
c) transporting at least a portion of said sample through at least one of said sub-observation volumes by rotating the sample holder around the longitudinal axis during imaging.

26. The method according to claim 25, wherein said detecting has a detection system rise time of the same order of magnitude as the time it takes a point in the sample to pass a sub-observation volume, or shorter.

27. The method according to claim 25, wherein said array of sub-observation volumes is arranged in at least one row of observation volumes.

28. The method according to claim 27, wherein the angle between a virtual line drawn along said at least one row of sub-observation volumes and a motion vector of a sample being transported through at least one of the sub-observation volumes of the row is greater than zero.

29. The method according to claim 27, wherein said array of sub-observation volumes is arranged in at least one row of equidistant observation volumes.

30. The method according to claim 25, wherein said array of sub-observation volumes is arranged in a planar grid of observation volumes.

31. The method according to claim 30, wherein a normal vector of a virtual plane of said grid of sub-observation volumes and a motion vector of a sample being transported through at least one of the sub-observation volumes of the row are non-perpendicular.

32. The method according to claim 30, wherein said array of sub-observation volumes is arranged in a planar grid of equidistant observation volumes.

33. The method according to claim 25, wherein detection is made using an avalanche photo diode detector in Geiger mode.

34. The method according to claim 33, wherein detection is made using a gated avalanche photo diode detector run in Geiger mode.

35. The method according to claim 25, wherein the sample is arranged at a near constant radial distance from a rotational axis of the sample holder during rotation.

36. The method according to claim 25, wherein the samples are rotated at a speed in the range of 1-100 m/s relative to the sub-observation volumes.

37. The method according to claim 36, wherein the samples are rotated at a speed in the range of 5-50 m/s relative to the sub-observation volumes.

38. The method according to claim 36, wherein the samples are rotated at a speed in the range of 10-30 m/s relative to the sub-observation volumes.

39. The method according to claim 25, further comprising measuring a relative, tangential and/or radial position between the sample and the array of sub-observation volumes at least once per rotational lap of the sample holder in order to correlate the detected signals with a corresponding absolute position within the sample.

40. The method according to claim 25, wherein the samples are transported along the rotational axis of the cylindrical sample holder during rotation.

41. The method according to claim 25, further comprising spreading a liquid layer on the outward facing surface of the cylindrical sample holder during rotation.

* * * * *